(12) United States Patent
Roberts (10) Patent No.: US 10,044,178 B2
(45) Date of Patent: Aug. 7, 2018

(54) NOTIFICATION APPLIANCE ENCLOSURE

(71) Applicant: SimplexGrinnell LP, Westminster, MA (US)

(72) Inventor: James T. Roberts, Amherst, NH (US)

(73) Assignee: TYCO FIRE & SECURITY GmbH, Neuhausen am Rheinfall (CH)

(*) Notice: Subject to any disclaimer, the term of this patent is extended or adjusted under 35 U.S.C. 154(b) by 0 days.

(21) Appl. No.: 13/890,351

(22) Filed: May 9, 2013

(65) Prior Publication Data
US 2014/0332525 A1 Nov. 13, 2014

(51) Int. Cl.
H02G 3/14 (2006.01)

(52) U.S. Cl.
CPC .................. H02G 3/14 (2013.01)

(58) Field of Classification Search
CPC ..................................................... H02G 3/14
USPC ......... 220/3.8, 3.94, 4.02, 3.3, 254.1, 254.3, 220/254.4, 254.7, 325, 784, 780, 793, 220/260, 281, 284, 285; 312/222; 361/679.01; 340/693.5, 693.9, 693.12
See application file for complete search history.

(56) References Cited

U.S. PATENT DOCUMENTS

| | | | | |
|---|---|---|---|---|
| 4,120,615 | A * | 10/1978 | Keem et al. | 417/360 |
| 4,896,784 | A * | 1/1990 | Heath | 220/3.2 |
| 5,805,071 | A * | 9/1998 | Hur | 340/693.9 |
| 5,969,627 | A * | 10/1999 | Tarlton et al. | 340/693.12 |
| 6,133,843 | A * | 10/2000 | Davidson | 340/693.9 |
| 6,297,745 | B1 | 10/2001 | Meier | |
| 6,838,997 | B1 * | 1/2005 | Davidson | 340/693.9 |
| 8,254,095 | B2 | 8/2012 | Carey et al. | |
| 2004/0056773 | A1 * | 3/2004 | Zimmerman | G08B 5/38 340/815.4 |
| 2004/0222226 | A1 * | 11/2004 | Gottainer | B65D 43/0212 220/284 |

OTHER PUBLICATIONS

U.S. Appl. No. 13/610,801, filed Sep. 11, 2012, entitled: "Notification Appliance Enclosure".

* cited by examiner

*Primary Examiner* — Andrew T Kirsch
*Assistant Examiner* — Jennifer Castriotta (57) ABSTRACT

A notification appliance enclosure is disclosed that facilitates convenient attachment and removal of a cover thereof. The enclosure may include a housing having at least one retaining catch extending from a first side thereof and at least one pivot catch extending from a second side thereof. The enclosure may further include a cover adapted to fit over the housing, the cover having at least one retaining catch recess and at least one pivot catch recess formed therein and adapted to receive the retaining catch and the pivot catch, respectively, to secure the cover against movement away from the housing when the cover and the housing are connected to one another. The cover may further include a catch release pocket adapted to receive the tip of a tool or implement for allowing the retaining catch and the retaining catch recess to be forcibly moved out of engagement with one another.

11 Claims, 6 Drawing Sheets

NOTIFICATION APPLIANCE ENCLOSURE

FIELD OF THE DISCLOSURE

The disclosure relates generally to the field of notification appliances, and more particularly to a notification appliance enclosure having a cover that can be quickly and easily attached and detached from a housing thereof.

BACKGROUND OF THE DISCLOSURE

Emergency notification systems typically include a plurality of notification appliances, such as strobes and horns, for providing occupants of a building with a prominent visual or auditory indication of a hazardous condition, such as the presence of smoke or fire. Typically, a notification appliance is attached to an electrical backbox, which in turn is mounted on a wall or ceiling surface (e.g., surface mounted or wire mold mounted) or embedded in a wall. Electrical leads or wires extend from a notification system circuit into the backbox through knock-outs in the rear or sides of the backbox. A mounting plate is typically used to attach a notification appliance to the front of the backbox, with audible and/or visual alarm-generating elements of the notification appliance fastened to the mounting plate and having electrical leads extending through the mounting plate and into the backbox. A rigid housing is typically mounted over the audible and/or visual alarm-generating elements, and a removable cover is mounted over the housing, thereby providing the notification appliance with a secure enclosure.

At times, it may be necessary or desirable to remove the cover of a notification appliance from the appliance's housing, such as for replacing the cover if it is damaged, for accessing and adjusting the operational settings of the notification appliance, or for painting a portion of a wall or ceiling immediately adjacent the notification appliance. Many conventional notification appliance enclosures include covers that are secured to respective housings with one or more screws or other mechanical fasteners that must be fastened and unfastened with a tool during mounting and removal of the covers. Such fastening and unfastening can be tedious and time-consuming, especially when aggregated over a large number of appliances that may be part of an overall emergency notification system. In spite of this, screws and other such fasteners are used because they provide appliance enclosures with sufficient robustness to satisfy industry standards. For example, Underwriters Laboratories (UL) requires that notification appliance enclosures be able to withstand certain impact forces without opening or being significantly damaged.

SUMMARY

In view of the foregoing, a robust notification appliance enclosure is disclosed having a cover that can be easily removed and replaced in a relatively short period of time (e.g. less than five seconds), with relatively little effort and without the use of specialized tools or separate fasteners.

An exemplary notification appliance enclosure in accordance with the present disclosure may include a housing adapted to contain at least one notification appliance, the housing having at least one retaining catch extending from a first side thereof and at least one pivot catch extending from a second side thereof. The enclosure may further include a cover adapted to fit at least partially over the housing, the cover having at least one retaining catch recess and at least one pivot catch recess formed therein, wherein the at least one retaining catch recess and the at least one pivot catch recess are adapted to receive the retaining catch and the pivot catch, respectively, to secure the cover against movement away from the housing when the cover and the housing are connected to one another. The cover may further include a catch release pocket adapted to receive the tip of a tool or implement for allowing the retaining catch and the retaining catch recess to be forcibly moved out of engagement with one another.

BRIEF DESCRIPTION OF THE DRAWINGS

By way of example, specific embodiments of the disclosed device will now be described, with reference to the accompanying drawings, in which.

DETAILED DESCRIPTION

Figure 1:
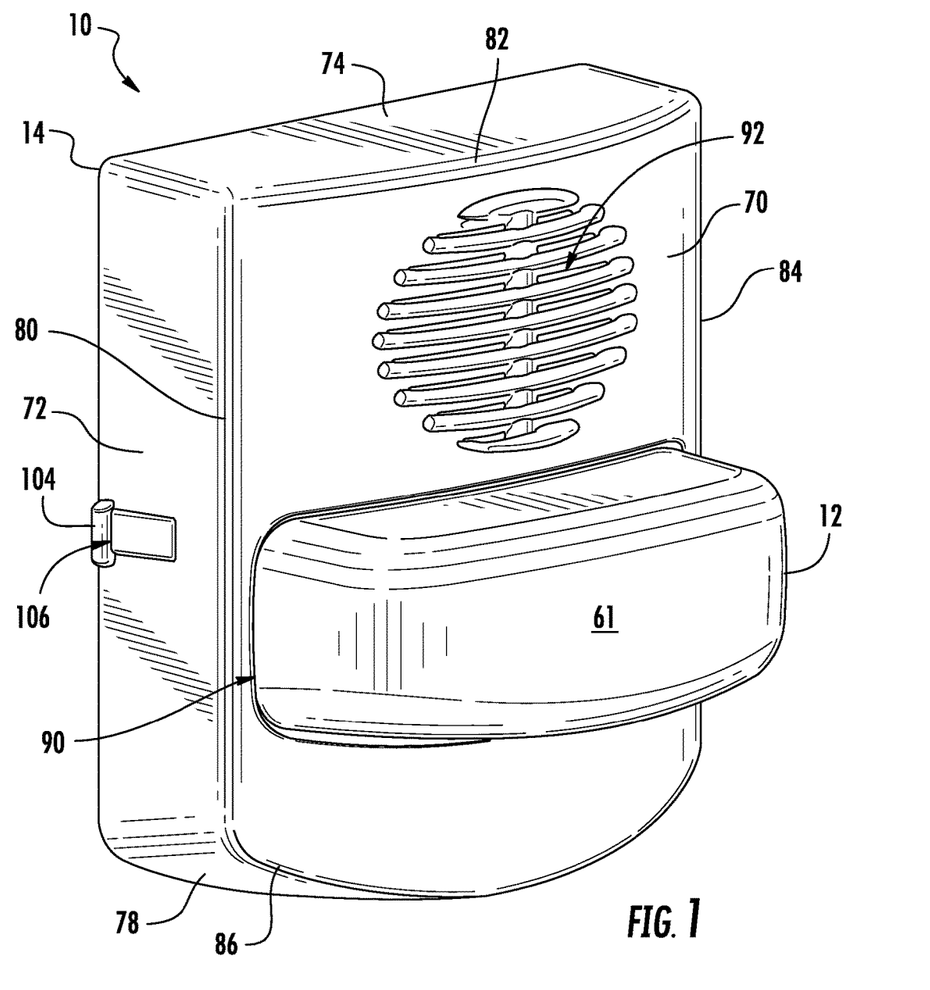
FIG. 1 is a front perspective view illustrating an embodiment of a notification appliance enclosure in accordance with the present disclosure.
Figure 2:
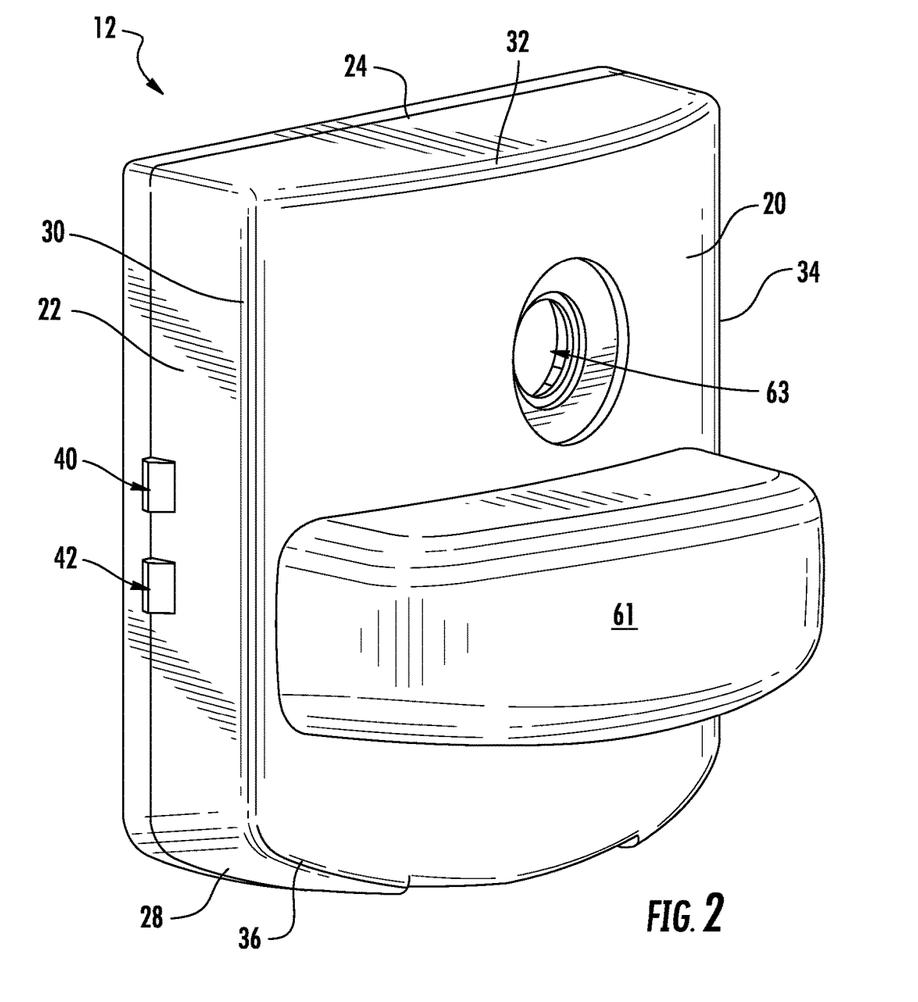
FIG. 2 is a front perspective view illustrating the housing of the notification appliance enclosure shown in FIG. 1.

Referring to FIGS. 1 and 2, a notification appliance enclosure 10 (hereinafter referred to as "the enclosure 10") in accordance with the present disclosure is shown. The enclosure 10 is arranged so that a cover portion of the enclosure can be quickly and conveniently removed to enable a user to access one or more internal components housed therein. The enclosure 10 can be used in conjunction with virtually any type of notification appliance, including, but not limited to, various types of strobes, digital displays, horns, buzzers, chimes, bells, speakers, and various combinations thereof. Any particular notification appliances that are described herein are therefore provided by way of example only and are not meant to be limiting in any way.

For the sake of convenience and clarity, terms such as "front," "rear," "top," "bottom," "up," "down," "inwardly," "outwardly," "lateral," and "longitudinal" will be used herein to describe the relative placement and orientation of components of the enclosure 10, each with respect to the geometry and orientation of the enclosure 10 as it appears in FIG. 1. Said terminology will include the words specifically mentioned, derivatives thereof, and words of similar import.

Referring to FIG. 1, the enclosure 10 may include a housing 12, and an overlying cover 14. As will be appreciated, the housing 12 may contain the functional components of the notification appliance, while the cover 14 may provide a finished outer appearance to the appliance. It is contemplated that the housing 12 and the cover 14 may be formed partially or entirely of various plastics, metals, or composites that are suitably durable and resilient for being formed and manipulated in the manner described herein. It is further contemplated that the housing 12 and the cover 14 may be formed of the same material or different materials.

As will be described in greater detail later, it is desirable to allow a user to easily remove the cover 14 from the housing 12 to perform maintenance, etc. The disclosed arrangement enables a user to disconnect one or more catches disposed on one side of the device using a standard hand tool, and to pivot the cover 14 away from the housing 12. Reinstalling the cover 14 on the housing 12 is performed by pressing the two together and snapping the catches back in place. As will be appreciated, the disclosed arrangement enables the user to access the housing with speed and ease as compared to prior arrangement that engage the cover to the housing using screws.

Figure 4:
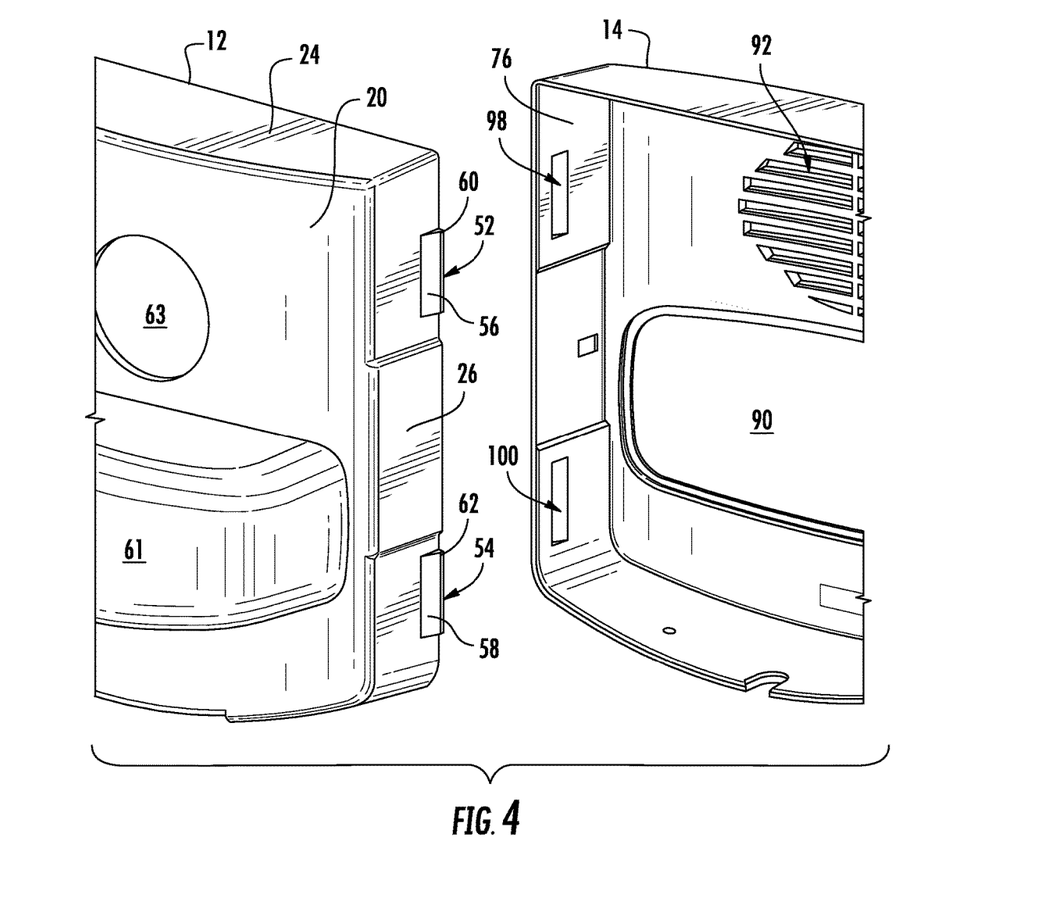
FIG. 4 is a perspective view illustrating a partial front of the housing and a partial rear of the cover of the notification appliance enclosure shown in FIG. 1.
Figure 5:
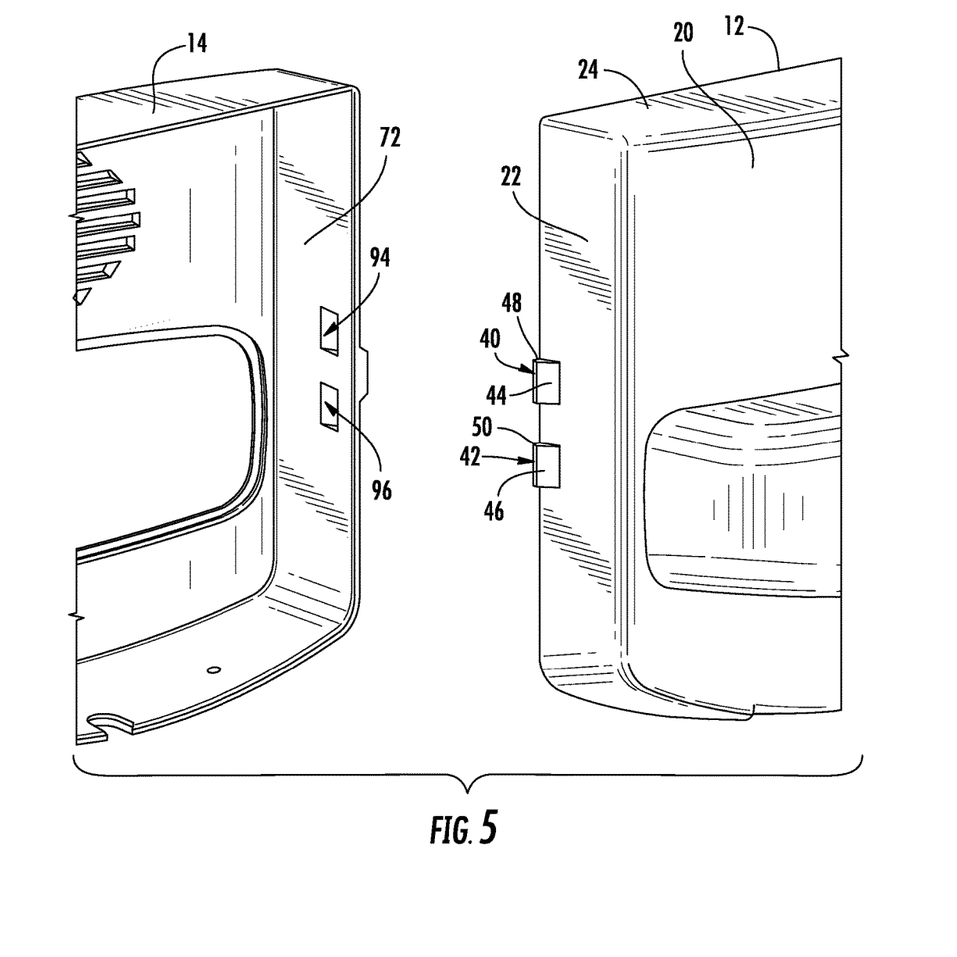
FIG. 5 is a perspective view illustrating a partial front of the housing and a partial rear of the cover of the notification appliance enclosure shown in FIG. 1.

Referring to FIGS. 2, 4, and 5, the housing 12 may be a substantially rectangular member having a front wall 20 and plurality of adjoining sidewalls 22, 24, 26 and 28 extending rearward from the peripheral edges 30, 32, 34, and 36 thereof. The lower edge 36 and lower sidewall 28 of the housing 12 may have a convex curvature as shown, but this is not critical. It is contemplated that the lower edge 36 and lower sidewall 28 may alternatively be straight, concave, or angled, for example. Similarly, it is contemplated that instead of being straight, the edges 30-34 and sidewalls 22-26 may alternatively be convex, concave, or angled, for example.

Referring to FIGS. 2 and 5, a pair of vertically-spaced retaining catches 40 and 42 may extend from the outer surface of the sidewall 22 of the housing 12. The retaining catches 40 and 42 may be wedge-shaped or ramp-shaped members defined by respective front walls 44 and 46 that are angled outwardly from front to rear relative to the sidewall 22, and respective rear walls 48 and 50 that are substantially perpendicular to the sidewall 22. It is contemplated, however, that the exact shape and configuration of the retaining catches 40 and 42 may be varied without departing from the present disclosure. In addition, while two retaining catches 40 and 42 are shown, embodiments of the housing 12 are contemplated in which only one, or in which more than two, retaining catches are provided.

Referring to FIG. 4, a pair of vertically-spaced pivot catches 52 and 54 may extend from the outer surface of the sidewall 26 of the housing 12. The pivot catches 52 and 54 may be substantially wedge-shaped or ramp-shaped members that are substantially similar to the retaining catches 40 and 42 described above. Particularly, the pivot catches 52 and 54 may be defined by respective front walls 56 and 58 that are angled outwardly from front to rear relative to the sidewall 26, and respective rear walls 60 and 62 that are substantially perpendicular to the sidewall 26. It is contemplated, however, that the exact shape and configuration of the pivot catches 52 and 54 may be varied without departing from the present disclosure. In addition, while two pivot catches 52 and 54 are shown, embodiments of the housing 12 are contemplated in which only one, or in which more than two, pivot catches are provided.

While the retaining catches 40 and 42 have been shown and described as extending from the sidewall 22 of the housing 12 and the pivot catches 52 and 54 have been shown and described as extending from the sidewall 26 of the housing 12, it is contemplated that the retaining catches 40 and 42 may alternatively extend from the sidewall 26 and that the pivot catches 52 and 54 may alternatively extend from the sidewall 22. Still further, it is contemplated that the retaining catches 40 and 42 may extend from the sidewall 24 and that the pivot catches 52 and 54 may extend from the sidewall 28 or vice versa. In general, the retaining catches 40 and 42 may be formed on an opposite side of the housing 12 relative to the pivot catches 52 and 54.

The front wall 20 of the housing 12 may include a convex protrusion 61 formed of a substantially transparent material, such as transparent thermoplastic, for receiving and providing clear visibility of a strobe or other visual notification device that is mounted within the enclosure 10. The front wall 20 may further include an aperture 63 for allowing an auditory notification device, such as a horn, to clearly project sound through the housing 12. It will be appreciated by those of ordinary skill in the art that the front wall 20 and/or sidewalls 22-28 of the housing 12 may additionally or alternatively include various other protrusions, apertures, perforations, and the like for accommodating the structural and functional features of a particular notification appliance that may be mounted within the enclosure 10.

Figure 3:
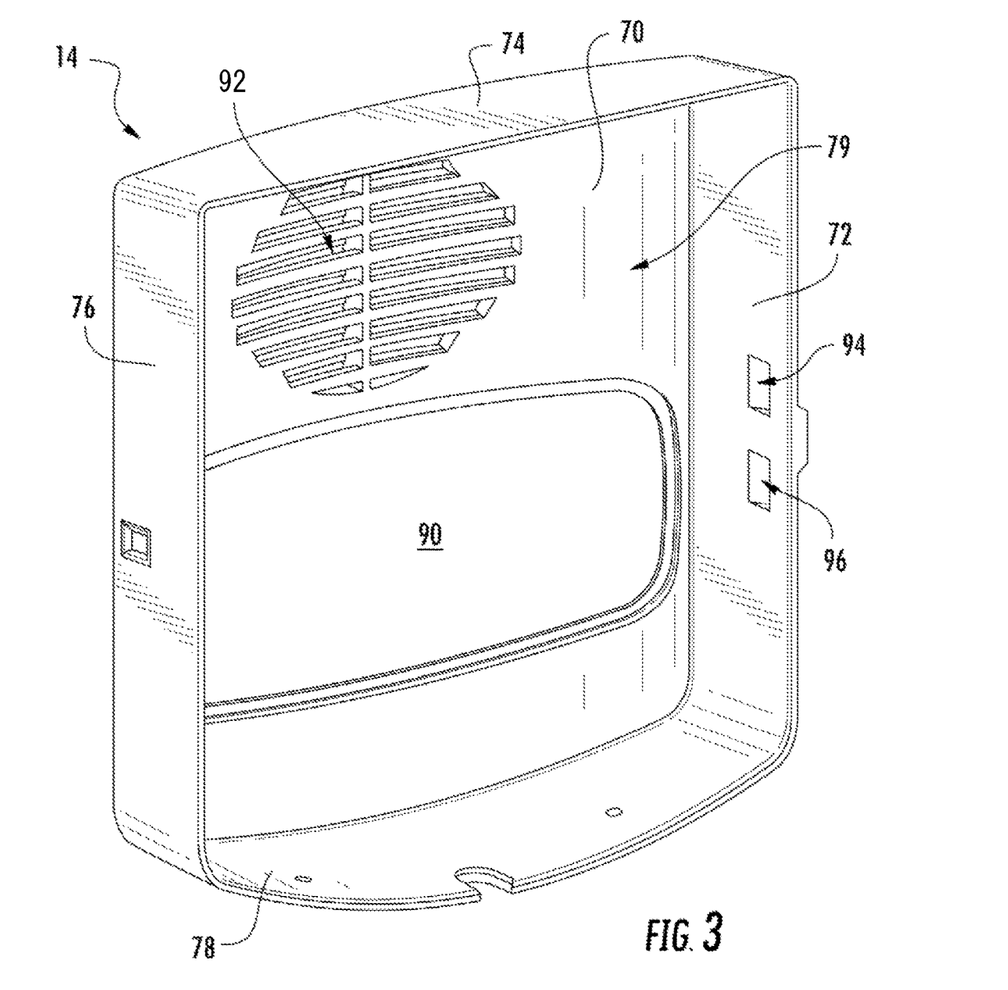
FIG. 3 is a rear perspective view illustrating the cover of the notification appliance enclosure shown in FIG. 1.

Referring now to FIGS. 1 and 3, the cover 14 of the enclosure 10 may be a substantially rectangular member having substantially the same shape as, but slightly larger dimensions than, the housing 12 described above. Particularly, the cover 14 may be defined by a front wall 70 and adjoining sidewalls 72, 74, 76, and 78 that extend rearward from the peripheral edges 80, 82, 84, and 86 thereof to define a rear cavity 79. The lower edge 86 and lower sidewall 78 of the cover 14 may be formed with a convex curvature to match the convex curvature of the lower edge 36 and lower sidewall 28 of the housing 12. Of course, if the edge 36 and sidewall 28 of the housing 12 are formed with a different shape, such as straight, concave, or angled, the sidewall 72 of the cover 14 may be formed with a complementary shape for fitting over the housing 12.

The front wall 70 of the cover 14 may include an aperture 90 having a size and shape that are similar to the peripheral size and shape of the convex protrusion 61 of the housing 12. The aperture 90 may be provided for allowing the convex protrusion 61 to extend through the cover 14 when the cover 14 is mounted over the housing 12 as shown in FIG. 1. The front wall 70 may further include a plurality of slots or apertures 92 that may be substantially aligned with the aperture 63 in the housing 12 when the cover 14 is mounted over the housing 12. The slots 92 may thereby allow sound emitted by an auditory notification device within the enclosure 10 to project through the cover 14. It will be appreciated by those of ordinary skill in the art that the cover 14 may additionally or alternatively include various other apertures, perforations, protrusions, and the like for accommodating the structural and functional features of a particular notification appliance that is mounted within the enclosure 10.

Referring to FIG. 3, a pair of vertically-spaced retaining catch recesses 94 and 96 may be formed in the inner surface of the sidewall 72 of the cover 14. The retaining catch recesses 94 and 96 may be depressions or cavities having a shape and size adapted for receiving and securing the retaining catches 40 and 42 as further described below. The retaining catch recesses 94 and 96 may be separated from one another by a vertical distance that facilitates at least partial alignment with the retaining catches 40 and 42 of the housing 12 when the cover 14 is mounted over the housing 12. For example, the retaining catch recesses 94 and 96 may be separated from one another by a vertical, on-center distance that is approximately equal to the vertical, on-center distance that separates the retaining catches 40 and 42. While two retaining catch recesses 94 and 96 are shown, it will be understood that alternative embodiments of the cover 14 may include at least as many retaining catch recesses as there are retaining catches extending from the housing 12.

Referring to FIG. 4, a pair of vertically-spaced pivot catch recesses 98 and 100 may be formed in the inner surface of the sidewall 76 of the cover 14. Like the retaining catch recesses 94 and 96 described above, the pivot catch recesses 98 and 100 may be depressions or cavities having a shape and size adapted for receiving and securing the pivot catches 52 and 54 as further described below. Also like the retaining catch recesses, 94 and 96, the pivot catch recesses 98 and 100 may be separated from one another by a vertical distance that facilitates at least partial alignment with the pivot catches 52 and 54 of the housing 12 when the cover 14 is mounted over the housing 12. For example, the pivot catch recesses 98 and 100 may be separated from one another by a vertical, on-center distance that is approximately equal to the vertical, on-center distance that separates the pivot catches 52 and 54. While two pivot catch recesses 98 and 100 are shown, it will be understood that alternative embodiments of the cover 14 may include at least as many pivot catch recesses as there are pivot catches extending from the housing 12.

While the retaining catch recesses 94 and 96 have been shown and described as being formed in the sidewall 72 of the cover 14, it will be appreciated that, in alternative embodiments of the enclosure 10, the retaining catch recesses 94 and 96 may be formed in any sidewall of the cover 14 that corresponds to the sidewall of the housing 12 from which the retaining catches 40 and 42 extend. Similarly, while the pivot catch recesses 98 and 100 have been shown and described as being formed in the sidewall 76 of the cover 14, it will be appreciated that, in alternative embodiments of the enclosure 10, the pivot catch recesses 98 and 100 may be formed in any sidewall of the cover 14 that corresponds to the sidewall of the housing 12 from which the pivot catches 52 and 54 extend.

Figure 6:
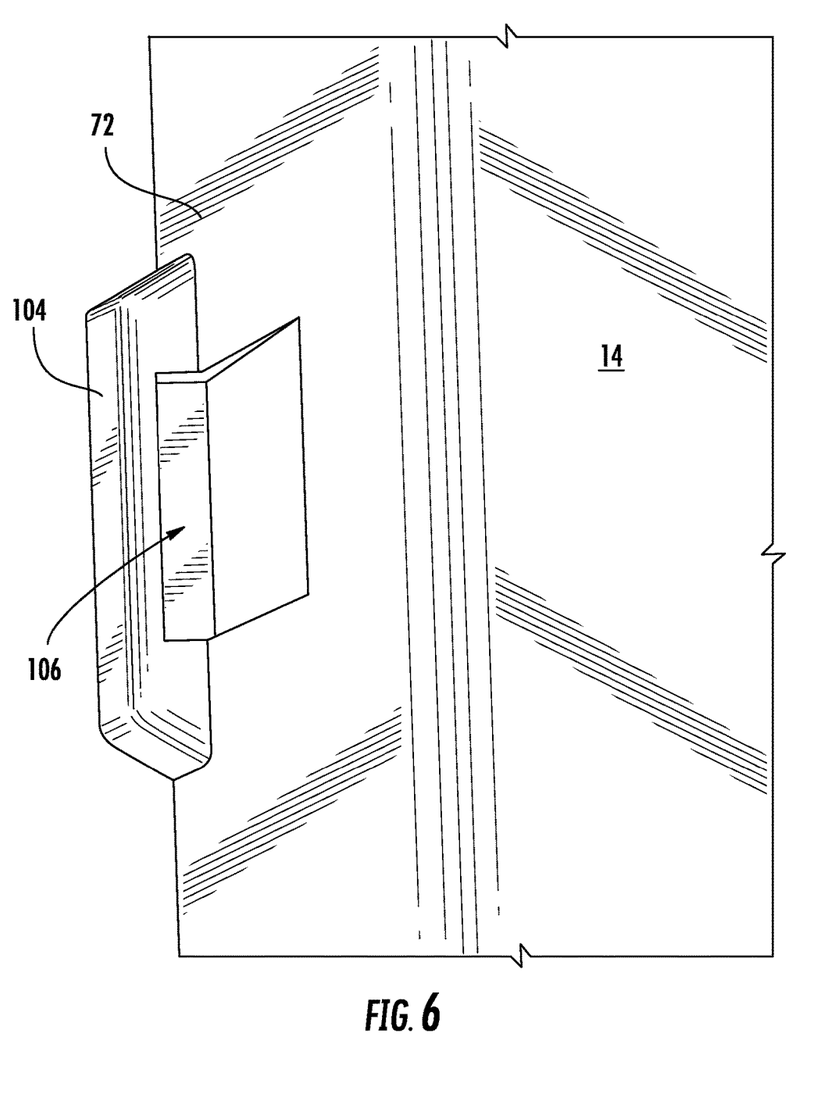
FIG. 6 is a perspective detail view illustrating the catch release pocket of the cover of the notification appliance enclosure shown in FIG. 1.

Referring to FIGS. 1 and 6, a flange 104 may extend from the outer surface of the sidewall 72 of the cover 14 and may define a catch release pocket 106. Alternatively, it is contemplated that the flange 104 may be omitted and that the catch release pocket 106 may be formed in the sidewall 72 itself. As illustrated, the catch release pocket 106 is disposed "over" the retaining catches 40, 42 (FIG. 2) when the cover 14 is installed on the housing 12. Thus, by inserting the tip of a tool into the catch release pocket 106 and prying outward, the retaining catch recesses 94, 96 of the cover 14 can be disengaged from the retaining catches 40, 42 of the housing 12 to enable the cover to be removed from the housing. The catch release pocket 106 is shown as being rectangular in shape, but this is not critical, and the catch release pocket 106 may be of any size or shape that may receive an implement, such as the tip of a conventional flat head or Phillips head screwdriver, inserted therein or therethrough to enable the sidewall 72 to be pried outward so to disengage the cover from the housing in the aforementioned manner.

In order to mount the cover 14 to the housing 12, the cover 14 may initially be placed over the housing 12 with the housing extending partially into the rear cavity 79 of the cover 14 and with the front wall 20 of the housing 12 disposed in a substantially parallel relationship with the front wall 70 of the cover 14. By applying a rearward-directed manual force to the cover 14, the cover 14 may be slid further onto the housing 12 (i.e., the housing 12 may slide further into the rear cavity 79). After sliding a short distance in this manner, the rear edges of the sidewalls 72 and 76 of the cover 14 may be brought into engagement with the outwardly-angled front walls 44 and 46 of the retaining catches 40 and 42 and the front walls 56 and 58 of the pivot catches 52 and 54, respectively.

By applying an additional amount of rearward-directed manual force to the cover 14, the sidewalls 72 and 76 may be forcibly flexed or deflected outwardly by the front walls 44, 46, 56, and 58 of the respective retaining catches 40 and 42 and pivot catches 52 and 54. The sidewalls 72 and 76 are thereby able to slide over the retaining catches 40 and 42 and pivot catches 52 and 54 until the retaining catch recesses and pivot catch recesses move over the rear walls 48, 50, 60, and 62 of the retaining catches 40 and 42 and pivot catches 52 and 54, respectively, at which point the retaining catches 40 and 42 and pivot catches 52 and 54 may "snap" into the retaining catch recesses 94 and 96 and pivot catch recesses 98 and 100 with a palpable engagement. The rear walls 48, 50, 60, and 62 of the retaining catches 40 and 42 and pivot catches 52 and 54 may thereafter act as "stops" that prevent the cover 14 from being moved in the reverse direction (i.e., forward), out of engagement with the retaining catch recesses 94 and 96 and pivot catch recesses 98 and 100.

With the retaining catches 40 and 42 and pivot catches 52 and 54 secured in the manner described above, the cover 14 may be firmly attached to the housing 12. Assembled thusly, the enclosure 10 may sustain substantial impacts or jarring, such as may be administered during impact force testing, without the cover 14 becoming disengaged from the housing 12. In this way, the cover 14 may be securely attached to the housing 12 in a convenient, expeditious manner that does not require the time-consuming application of mechanical fasteners to join the two components.

To remove the cover 14 from the housing 12, such as may be necessary for replacing the cover 14, for accessing and adjusting operational settings of a notification appliance, etc., a service person may insert a portion of a tool or implement, such as the tip of screwdriver, into the catch release pocket 106 of the cover 14. The service person may then manipulate the tool to "lever" the sidewall 72 of the cover 14 away from the sidewall 22 of the housing 12, thereby moving the retaining catch recesses 94 and 96 out of engagement with the retaining catches 40 and 42. That is, the sidewall 72 of the cover 14 may be moved away from the sidewall 22 of the housing 12 until the retaining catches 40 and 42 no longer extend into the retaining catch recesses 94 and 96. The left side of the cover 14 (as oriented in FIG. 1) may then be pivoted away from the housing 12 about the pivot catches 52 and 54 without resistance. The cover 14 may then be lifted off of the pivot catches 52 and 54 and rotated completely away from the housing 12. Thus, the cover 14 may be separated from the housing 12 in a convenient, expeditious manner without engaging in the time-consuming removal of any mechanical fasteners.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The invention claimed is:

1. A notification appliance enclosure, comprising:
a housing for receiving a notification appliance, the housing having a first retaining catch extending from a first sidewall of the housing, a second retaining catch extending from the first sidewall of the housing and disposed a distance away from the first retaining catch, a first pivot catch extending from a second sidewall of the housing, a second pivot catch extending from the second sidewall of the housing and disposed a distance away from the first pivot catch;

a cover adapted to fit over at least a portion of the housing, the cover having a first retaining catch recess formed as a concave depression into a thickness of a first sidewall of an inner surface the cover, a second retaining catch recess formed as a concave depression into the thickness of the inner surface of the first sidewall of the cover a distance away from said first retaining catch recess, a flange extending a distance away from an outer surface of the first sidewall of the cover and disposed between the first retaining catch and the second retaining catch and defining a catch release pocket, a first pivot catch recess formed as a concave depression into a thickness of a second sidewall of the cover and a second pivot catch recess formed as a concave-depression into the thickness of the second sidewall of the cover a distance away from the first pivot catch recess, wherein the first sidewall and the second sidewall of the cover are adapted to flex upon forceful engagement of the first and second retaining catches and the first and second pivot catches with non-recessed portions of the first sidewall and the second sidewall of the cover, and the first and second retaining catch recesses and the first and second pivot catch recesses are adapted to receive the first and second retaining catches and the first and second pivot catches, respectively, to secure the cover against movement away from the housing when the cover and the housing are connected to one another.

2. The notification appliance enclosure in accordance with claim 1, wherein the catch release pocket is positioned adjacent to the first and second retaining catches of the housing when the cover and the housing are connected to one another.

3. The notification appliance enclosure in accordance with claim 1, wherein the housing comprises a front wall, the first sidewall and a plurality of adjoining sidewalls extending rearward from the front wall.

4. The notification appliance enclosure in accordance with claim 3, wherein each of the first and second retaining catches has a front wall extending from an outer surface of the first sidewall of the plurality of adjoining sidewalls, the front wall angled outwardly as it extends rearward along the first sidewall.

5. The notification appliance enclosure in accordance with claim 4, wherein the pivot catch has a front wall extending from an outer surface of the second sidewall of the plurality of adjoining sidewalls, the front wall of the pivot catch angled outwardly as it extends rearward along the second sidewall.

6. The notification appliance enclosure in accordance with claim 1, wherein the first sidewall of the cover is resiliently deformable to enable repeated engagement and disengagement with the housing.

7. A notification appliance enclosure comprising:
a housing adapted to contain at least one notification appliance, the housing defined by a front wall, a first sidewall and a second sidewall each extending rearward from the front wall, the housing having first and second retaining catches extending from the first sidewall and first and second pivot catches extending from an outer surface of the second sidewall;

a cover adapted to fit at least partially over the housing, the cover defined by a front wall and a first sidewall and a second sidewall each extending rearward from the front wall, the cover having first and second retaining catch recesses formed as concave depressions into a thickness of the first sidewall of the cover and first and second pivot catch recesses formed as concave depressions into a thickness of the second sidewall of the cover, wherein the first sidewall and the second sidewall of the cover are adapted to flex upon forceful engagement of the first and second retaining catches and the first and second pivot catches with non-recessed portions of the first sidewall and the second sidewall of the cover, and the first and second retaining catch recesses and the first and second pivot catch recesses are adapted to receive the first and second retaining catches and the first and second pivot catches, respectively, to secure the cover against relative movement with respect to the housing when the cover and the housing are coupled together; and a flange extending perpendicularly away from the first sidewall of the cover and disposed between the first retaining catch and the second retaining catch, the flange defining a catch release pocket.

8. The notification appliance enclosure in accordance with claim 7, wherein the catch release pocket is a rectangular slot configured to receive a tip portion of a flat head screwdriver.

9. The notification appliance enclosure in accordance with claim 7, wherein the first and second retaining catches each have a wedge-shape with a tapered, forward most edge.

10. The notification appliance enclosure in accordance with claim 7, wherein the first and second pivot catches each have a wedge-shape with a tapered, forward most edge.

11. The notification appliance enclosure in accordance with claim 7, wherein the cover is resiliently deformable to enable repeated engagement and disengagement with the housing.

* * * * *